L. SPIERER.
BEARING.
APPLICATION FILED MAR. 7, 1921.
1,396,295.
Patented Nov. 8, 1921.
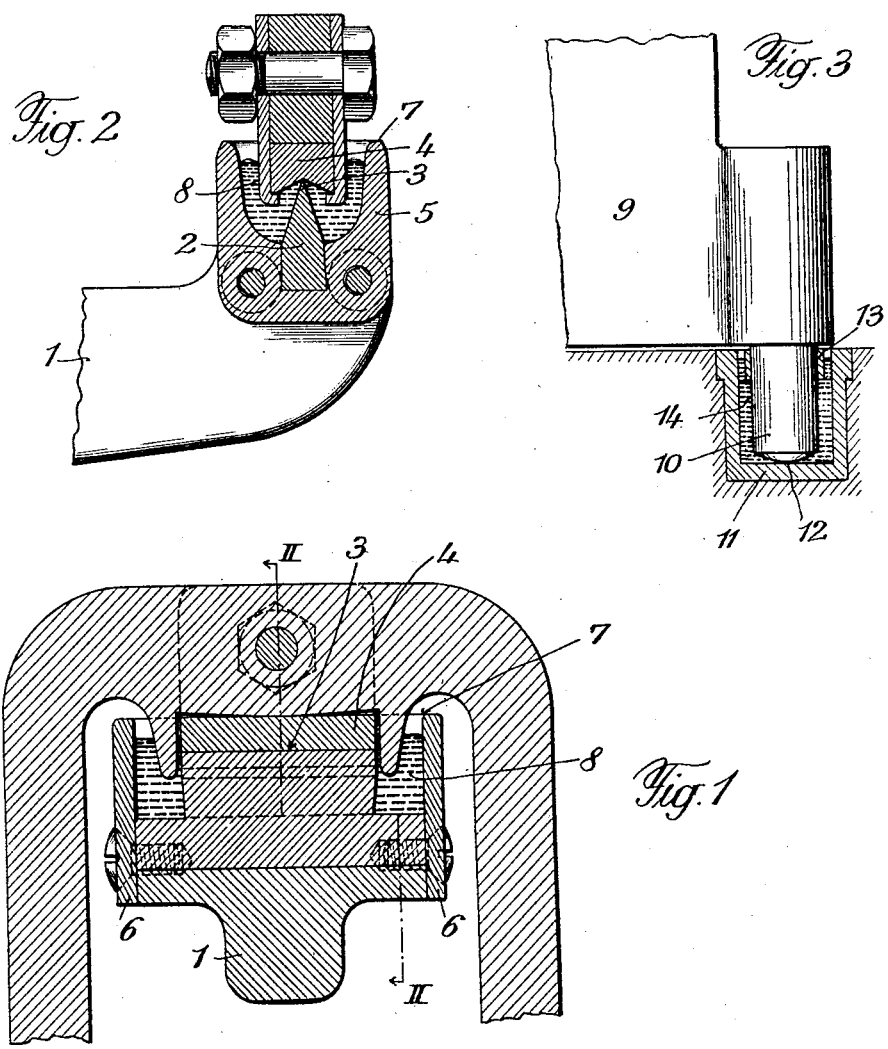
Inventor.
Leon Spierer,
By [signature]
atty.

UNITED STATES PATENT OFFICE.

LÉON SPIERER, OF GENEVA, SWITZERLAND.

BEARING.

1,396,295.  Specification of Letters Patent.  Patented Nov. 8, 1921.

Application filed March 7, 1921. Serial No. 450,156.

*To all whom it may concern:*

Be it known that I, LÉON SPIERER, a citizen of the Republic of Switzerland, residing at Geneva, Switzerland, have invented certain new and useful Improvements in Bearings; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The invention relates to improvements in bearings.

It is a well known fact that members of bearings such as pivots, knife-eges of scales and the like are attacked by dust, grit, dirt and also by atmospheric influences, dampness with which they come in contact, whereby the accuracy of the bearings is affected. If the bearings are lubricated with oil the dirt mixes with the oil forming a more or less consistent paste which tends to increase the wear and tear of the bearing members. It has been experienced with scales used in flour mills that the knife-edges of such scales are worn down within one year to such an extent that they have to be exchanged. During this exchange the scale has to be put out of action, furthermore the removal of the old knife-edges and the mounting of new knife-edges requires a great amount of work in order to restore the desired accuracy of the scale.

The object of the present invention is a protection of members of bearings against outside influences which prevents a wear of said bearing members resulting from the access of impurities into the bearings or from rust. This is attained by arranging the members of the bearings which sustain the load and move relatively to each other within a mercury bath.

Two modes of carrying the invention into effect are shown by way of example in the accompanying drawings in which:

Figure 1 shows a vertical section through a knife-edge bearing of a scale,

Fig. 2 is a section along line II—II of Fig. 1,

Fig. 3 illustrates a vertical section through a vertical thrust bearing.

Referring to Figs. 1 and 2 of the drawing, 1 denotes a lever or a steel yard of a scale, at the end of which lever a knife 2 is provided with its edge 3 pointing upward. Upon the knife-edge 3 the other bearing part rests by means of a cup or seat 4. In order to protect the members of the bearing sustaining the load the end of the lever 1 is of a U-shaped cross-section (Fig. 2). Thus the knife-edge 2 is arranged in a trough 5 which is closed at its ends by means of plates 6. The side walls of the trough and the plates 6 are of such a height, that their uppermost edges 7 are at a higher elevation than the edge 3 of the knife 2. The receptacle formed by the trough 5 and the plates 6 is filled with mercury 8 and the liquid level of the latter is higher than the edge 3 so that the edge 3 is completely submerged in the mercury In consequence of this arrangement dust, grit and other dirt cannot get into contact with the knife-edge 3. The latter is also protected against atmospheric influences so that it cannot rust. With such a protecting arrangement the bearing members maintain their accuracy for a long time, therefore such an arrangement is of great importance with automatic scales.

The protecting arrangement may also be applied to step bearings or pivot bearings such as are used for instance for supporting heavy doors. A bearing of this type is illustrated in Fig. 3. 9 denotes the door body provided with a vertical pivot 10. A cylindrical bush 11 of a larger inside diameter than the outside diameter of the pivot is provided which is closed at the bottom end by a flat wall on which the end face of the pivot 10 bears at 12. A ring 13 is provided coaxially to the bush 11, integral with and united to the latter by means of radial ribs, in which ring 13 the pivot 10 is guided laterally. The annular space between the bush 11 and the pivot 10 is filled up with mercury 14. In this manner the parts of the bearing which move relatively to each other and which take up the weight of the door are protected against any influences from outside. Grit which may drop into the annular space floats on the top of the mercury and is prevented from causing an increased wear of the bearing parts, as would be the case if the bearing were filled with oil.

I claim:

1. In a bearing, the combination of members for sustaining the load on the bearing and contacting with each other, and a mercury bath in which the point of contact of said members is submerged.

2. In a bearing, the combination of members for sustaining the load on the bearing and contacting with each other, a receptacle within which the point of contact of said members is arranged, and mercury filled in said receptacle to such a height that said point of contact is submerged.

In testimony that I claim the foregoing as my invention, I have signed my name.

LÉON SPIERER.